INVENTORS
WALTHER F. SCHEEL
LEO GOLDMAN

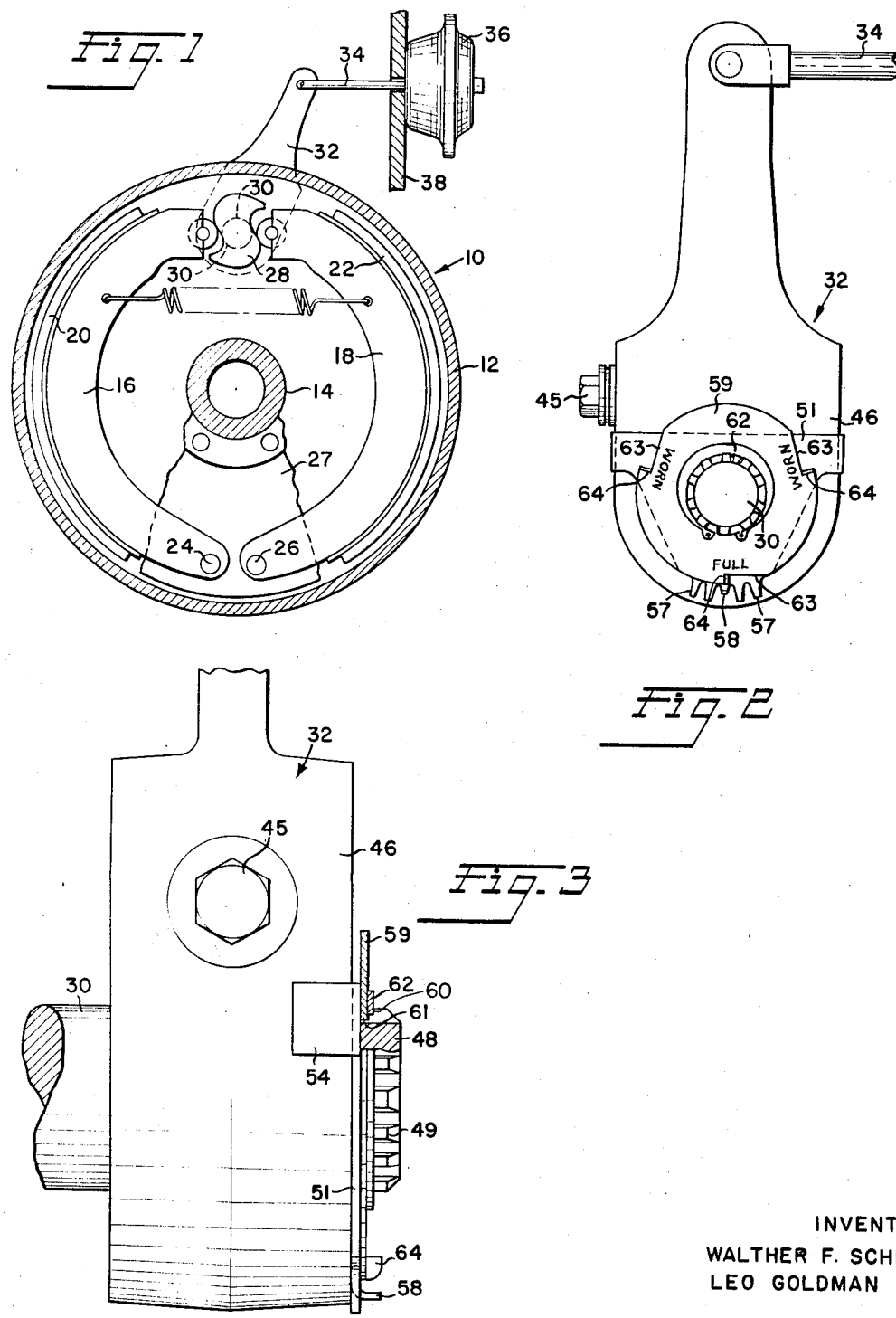

United States Patent Office 3,356,188
Patented Dec. 5, 1967

3,356,188
BRAKE LINING WEAR INDICATOR
Leo Goldman, Windsor, Ontario, Canada, and Walther F. Scheel, Detroit, Mich., assignors to Rockwell-Standard Corporation, Pittsburgh, Pa., a corporation of Delaware
Continuation of application Ser. No. 414,540, Nov. 30, 1964. This application Nov. 18, 1966, Ser. No. 596,723
6 Claims. (Cl. 188—79.5)

This application is a continuation of application Ser. No. 414,540 filed Nov. 30, 1964, now abandoned, for "Brake Lining Wear Indicator."

The present invention refers to a brake lining wear indicator and more particularly to an indicator of this type disposed in the brake actuating mechanism.

In vehicle brakes of the type having a cam disposed between two brake shoes and mounted on a motor driven rotatable cam shaft, it is common practice to accomplish rotation of the cam shaft by attaching a lever to the outer end of the cam shaft and connecting the lever to the diaphragm or piston of a fluid pressure motor. Some of these cam shaft levers provide for relative rotational adjustment of the cam shaft and lever about the cam shaft axis and are known as slack adjuster levers. Slack adjuster levers are either manually or automatically adjustable to compensate for brake lining wear, such adjustment being usually accomplished by rotating the cam shaft relative to the slack adjuster lever to reposition the cam between the brake shoe ends so that in the brake relaxed condition the distance between the brake shoe linings and the brake drum can be maintained about constant regardless of lining wear. The rotational position of the cam shaft is therefore an indication of the degree of wear of the brake linings.

It has been proposed prior to the present invention to provide a visual indicating means on a slack adjuster lever to indicate to an operator or maintenance worker the amount of lining worn off or remaining on the brake shoes without having to take off the wheels or otherwise disassemble the brakes. These indicator means may comprise a dial and a coacting pointer, one of which is attached to the slack adjuster lever and the other to the end of the relatively rotatable cam shaft.

In such prior devices difficulties have been encountered in securing the dial and/or the pointer to the lever or the cam shaft respectively. The part fastened to the end of the cam shaft was usually secured by means of a nut or cap screw which required the addition of threads or formation of a threaded hole to the end of the cam shaft, machining operations involving increased expense. Furthermore, such devices could only be provided as original equipment, not suitable for field conversion, since it requires the complete disassembly of the brake mechanism for the thread or threaded hole forming operations at the inner end of the cam shaft.

Furthermore, in these prior devices it was difficult to properly time the pointer with the dial for a correct reading of the amount of brake lining available.

The present invention has for its main object an improved indicating means for use with brake slack adjuster levers which avoids the foregoing disadvantages.

Another object of the invention is the provision of an improved brake lining wear indicating means for a cam shaft mounted slack adjuster lever which can be easily fastened to existing brake operating mechanism without the necessity of substantially modifying the cam shaft end.

Another object of the invention resides in the provision of coacting indicating members for a slack adjuster lever of the enclosed adjusting mechanism type mounted on a brake cam shaft comprising special index and dial plate members fabricated from sheet metal and adaptable to a variety of different slack adjuster levers.

Other novel features will become evident from the following detailed description in connection with the accompanying drawings wherein:

FIGURE 1 is a diagrammatic side elevation of vehicle brake assembly of the cam actuated type illustrating a slack adjuster provided with a preferred embodiment of the invention;

FIGURE 2 is an enlarged side elevation of the slack adjuster lever of FIGURE 1 showing details of the invention;

FIGURE 3 is a side view of the slack adjuster lever of FIGURE 2 partly broken away and sectioned to show further detail of the indicating means;

Figure 4:
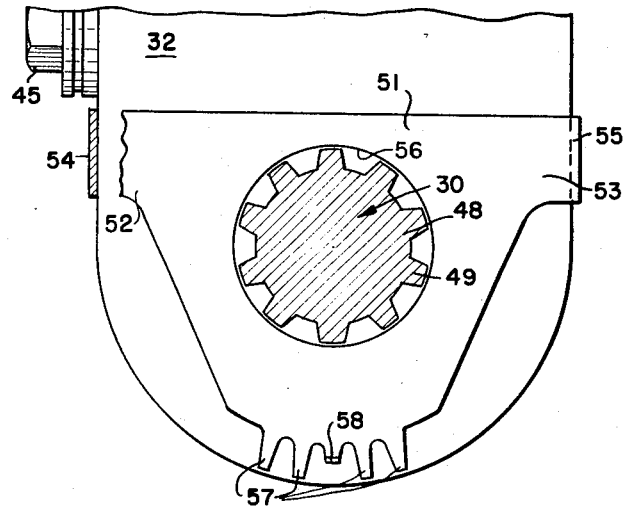
FIGURE 4 is a fragmentary side view partly in section and similar to the lower end of FIGURE 2 with the indicator dial removed.

FIGURE 1 shows a vehicle brake assembly 10 wherein a brake drum 12 is positioned around a vehicle axle 14 and in the usual manner adapted to rotate with the vehicle wheel (not shown). Brake drum 12 encloses brake shoes 16 and 18 having brake linings 20 and 22 respectively adapted to frictionally engage the drum. The brake shoes may be anchored at one end as at 24 and 26 on a spider 27 riveted or similarly secured to axle housing 14. The other ends of brake shoes 16 and 18 abut against an actuator cam 28 rotatably positioned between them. Cam 28 is adapted upon counterclockwise rotation in FIGURE 1 to displace brake shoes 16, 18 outwardly against relatively rotating brake drum 12.

Cam 28 is mounted on the inner end of a cam shaft 30 that is suitably rotatably supported in spider 27. The outer end of shaft 30 has attached thereto a lever 32 pivotally connected to the reciprocable pushrod 34 of a fluid pressure motor 36 carried by a bracket 38 on a relatively stationary part of the vehicle such as the axle housing. Upon actuation by motor 36, lever 32 may be angularly displaced to rock cam shaft 30 and cam 28 and thereby oppositely rock the brake shoes 16 and 18 into contact with brake drum 12.

Lever 32 is preferably a conventional type slack adjuster of the enclosed adjusting mechanism type employed in vehicle brakes, and may be of the manual or automatically adjustable type.

The illustrated slack adjuster lever 32 is of the manually adjustable type wherein the lever has an internal chamber 39 to enclose the outer end of cam shaft 30. Within chamber 39, a lever 41 is fixed on shaft 30, and a rockable pin 42 journalled on lever 41 has a threaded bore 43 receiving one end of an adjustment bolt 44 which has an external head 45 projecting from the chamber. This adjustment mechanism is enclosed within lever 32. When the brake lining becomes worn, cam 28 is rocked to the adjusted location that predetermines the returned position of the disengaged shoes by applying a wrench to head 45 and rotating bolt 44, the relative angular positions of lever 32 and shaft 30 thus being varied. Lever 32 maintains the same relative position with respect to motor 36 and the foregoing assures a constant stroke distance and displacement of brake shoes during operation during the life of the brake linings.

The foregoing manually adjustable slack adjuster mechanism may be essentially the same as disclosed in United States Patent No. 2,922,317 issued Jan. 26, 1960. Alternatively the cam shaft 30 may be associated with a slack adjuster lever assembly of the automatically adjusting type as dislosed in United States Letters Patent No. 3,154,178 issued Oct. 27, 1964.

Slack adjuster lever 32 comprises an enlarged portion 46 housing chamber 39 and the adjusting mechanism.

Figure 5:
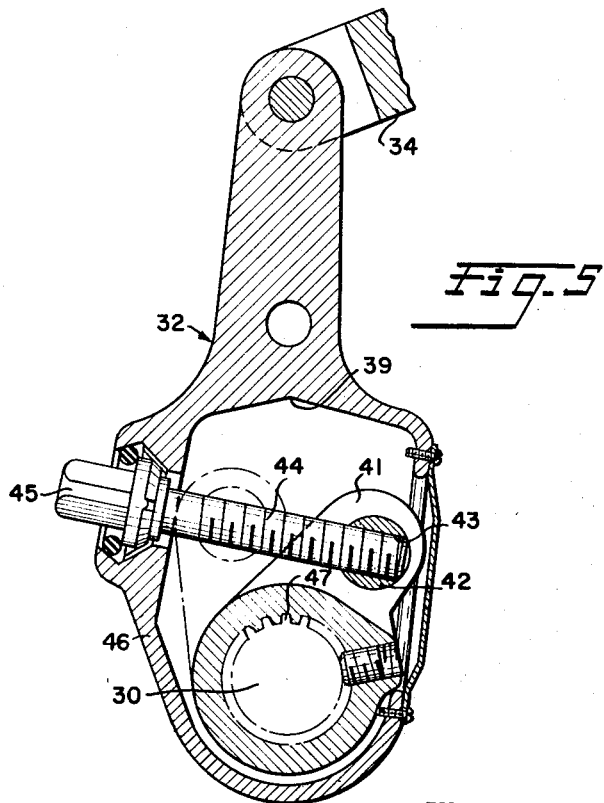
FIGURE 5 is a section substantially on line 5—5 of FIGURE 3 showing one form of internal slack adjuster lever mechanism.

The side walls of the lever housing 46 are apertured to suitably rotatably receive the end of cam shaft 30, and lever 41 is usually splined upon shaft 30 within the chamber 39 as shown at 47 in FIGURE 5.

As shown in FIGURE 3, the outer end 48 of shaft 30 projects through lever housing 46 is longitudinally splined at 49. As shown best in FIGURE 4 a generally triangular shaped sheet metal index plate 51 having outwardly extending arms 52 and 53 is fixedly attached upon the outside of the slack adjuster lever as by bending outer ends 54 and 55 of the arms around the edges of housing 46. Plate 51 which is thus fixed to lever housing 46 is provided with a central aperture 56 to freely pass the outer end of camshaft 30. Plate 51 is further provided with a number of downwardly extending integral tangs 57 equally spaced from each other, and in the assembly the middle tang 58 is usually bent outwardly to provide a short index element as will appear.

A circular dial plate 59 is provided with a splined aperture 61 whereby it is non-rotatably secured upon the splined end 49 of the cam shaft outside the housing 46 for rotating with the cam shaft in substantially sliding surface relation to index plate 51. Splines 49 are formed on a continuation of the cam shaft outside housing 46 in this embodiment. Dial plate 59 is axially held on the cam shaft by a snap ring 62 encircling a groove 60 in the splined shaft end 48.

Dial plate 59 has three peripheral half segments 63 cut away along its circumference and at the inner end of each half segment a section of the cut metal is turned outward away from plate 51 to form lips 64. The distance from the central lip 64 of FIGURE 2 to each of the other two lips 64 corresponds to the angular distance through which the cam shaft 30 may be rotated for adjustment from a new lining position where central lip 64 is aligned with central tang 58 as shown in FIGURE 2 to a completely worn lining position. For convenience, the central lip 64 on the dial plate 59 may be labeled "Full," and the lips at opposite sides may be labeled "Worn" to express the condition of the lining. It will be noted that this arrangement accommodates for operative movement of lever 32 in either direction of rotation.

In the initial position, that is when the brake lining on the shoes 16 and 18 is new, the short tang 58 lines up with the lip 64 at the "Full" position. During the course of rotationally adjusting the cam shaft 30 in relation to the lever 32, the dial plate 59 fixed upon the cam shaft is rotated with respect to index tang 58 thereby advancing either lip 64 marked "Worn," depending on the direction of actuating movement of lever 32, towards the tang 58. Thus at any adjustment position the approximate brake lining wear can be read off from the position of the dial plate relative to tang 58. Since the markings on the dial plate can become unreadable due to dirt and grease deposits, the approximate lining wear can be determined by feeling the relative position between tang 58 and the nearest lip 64.

The present novel device is advantageously adaptable for field conversion, that is, for installation on vehicles already in service which have projecting splined cam shaft ends as in said Letters Patent No. 3,154,178 since no shop work is required such as boring a tapped hole or cutting threads in the end of the cam shaft for screw fasteners. To install the present novel device in the field, the adjusting bolt 45 of the slack adjuster would be turned counterclockwise to the limit of travel, and then again backed off for ½ to a full turn depending on the diameter of the brake. The index plate 51 is mounted fixedly on lever 32. Dial plate 59 is now attached to the cam shaft end by the splined connection and snap ring 62. With the brake in "Off" position one of the fingers on the plate 51, usually the central one, will line up with the word "Full" on the dial plate. That finger is then bent upwards and becomes short tang 58. Then, the adjusting bolt 45 is rotated until proper lining clearance is obtained, and the dial plate 59 will thus be rotated in relation to the index plate 51 to indicate the approximate amount of lining on the shoes.

The present invention provides a relatively simple, inexpensive, easy to install indicating means for detecting worn brake linings, which can be easily assembled with minimum change and often without altering any parts in the existing brake actuating mechanisms.

The present invention may be embodied in other forms without departing from the spirit and essential characteristics thereof, therefore, the present embodiment is to be considered in all respects as illustrative only and not restrictive, the scope of the invention being indicated by the appended claims rather than by the foregoing description.

What is claimed and desired to be secured by Letters Patent is:

1. For use in a brake assembly of the type wherein a rotatably mounted cam shaft carries a cam disposed between separable brake shoes provided with drum engaging friction linings, a slack adjuster lever rotatably adjustably connected to the cam shaft and comprising means for rockably adjusting the cam shaft about its longitudinal axis to compensatively reposition the cam for redetermining the returning positions of the brake shoes as the brake lining wears, said shaft having a longitudinally splined section projecting from said lever, and means for indicating the relative rotation of said cam shaft with respect to said lever for indicating the degree of wear of the brake lining on said shoes comprising a separate index plate non-rotatably attached to said lever and apertured to pass the splined section of said cam shaft, a cooperating dial plate non-rotatably fitted onto said splined section adjacent to and axially outwardly of said index plate, one of said plates having circumferentially spaced marks corresponding to new and worn brake lining conditions, a plurality of circumferentially spaced apart index elements on the other of said plates, said index plate being mountable in selected, angularly spaced apart positions on said splined section to provide for the alignment between at least one of said index elements and the mark corresponding to new brake lining conditions when said cam shaft is adjusted to its new brake lining position, said one of said index elements cooperating with said marks to indicate the degree of brake lining wear, and means for axially retaining said dial plate on said splined section.

2. In the combination defined in claim 1, said slack adjuster lever being of the type having a housing enclosing mechanism for relatively rotatably adjusting the cam shaft and lever, and said index elements comprising relatively thin, radially extending fingers adapted to be manually bent to indicate the one of said fingers aligning with the new brake lining mark when said index plate is mounted in a selected one of its angularly spaced apart positions with said cam shaft in its adjusted new brake lining position.

3. For use in a brake assembly of the type wherein a rotatably mounted cam shaft carries at its inner end a cam disposed between separable brake shoes provided with drum engaging friction linings, a slack adjuster lever rotatably adjustably connected to the cam shaft and comprising a housing peripherally surrounding said cam shaft and means for rockably adjusting the cam shaft about its longitudinal axis to compensatively reposition the cam for redetermining the returned positions of the brake shoes as the brake lining wears, a longitudinally splined section formed on said cam shaft and projecting from said lever housing, and means for indicating the relative rotation of said cam shaft with respect to said lever for indicating the degree of wear of the brake lining on said shoes comprising a separate index plate non-rotatably attached to the outside of said lever housing and apertured to pass the end of said cam shaft and a cooperating dial plate non-rotatably fitted onto the splined section of said cam shaft adjacent to and axially outwardly of said index plate and provided with circumferentially spaced marks corresponding to new and worn brake lining conditions, means for axially retaining said dial plate on said cam shaft, and a multiplicity of circumferentially spaced apart, radially extending fingers formed on said index plate, said index plate being mountable in selected, angularly spaced apart positions on said splined section to provide for the alignment of at least one of said fingers with the mark corresponding to new brake lining condition when said cam shaft is adjusted to its new brake lining position, said one of said fingers cooperating with said marks to indicate the degree of brake lining wear, said fingers being manually bendable relative to each other to indicate the aligning finger cooperating with said marks.

4. For use in a brake assembly of the type wherein a rotatably mounted cam shaft carries at its inner end a cam disposed between separable brake shoes provided with drum engaging friction linings, a slack adjuster lever rotatably adjustably connected to the cam shaft and comprising a housing peripherally surrounding said cam shaft, with an end of said shaft projecting beyond said housing, and means for rockably adjusting the cam shaft about its longitudinal axis to compensatively reposition the cam for redetermining the returned positions of said brake shoes as the brake lining wears, and means for indicating the relative rotation of said cam shaft with respect to said lever for indicating the degree of wear of the brake lining on said shoes comprising a sheet metal index plate non-rotatably attached externally upon said lever and apertured to pass the end of said cam shaft projecting from said housing, said shaft end being longitudinally splined, a cooperating sheet metal dial plate non-rotatably fitted onto said cam shaft end adjacent to and axially outwardly of said index plate and provided with circumferentially spaced marks corresponding to new and worn brake lining conditions, means for axially retaining said dial plate on said cam shaft, and a multiplicity of circumferentially spaced apart, radially extending, thin fingers formed integral with said index plate, said index plate being mountable in selected, angularly spaced apart positions on said splined section to provide for the alignment between at least one of said fingers and the mark corresponding to new brake lining condition when said cam shaft is adjusted to its new brake lining position, said one of said fingers cooperating with said marks to indicate the degree of brake lining wear.

5. In the combination defined in claim 4 wherein said marks on the dial plate comprising out-turned integral tabs and wherein said each of said fingers is bendable outwardly relative to the other of said fingers to indicate the one of said fingers which was aligned with said new brake lining mark for coaction with said tabs.

6. In the combination defined in claim 5, said index plate being attached to said lever by integral end tabs that are bent around the side edges of said housing.

References Cited
UNITED STATES PATENTS

| | | | |
|---|---|---|---|
| 2,379,796 | 7/1945 | Freeman et al. | 188—79.5 |
| 2,522,903 | 9/1950 | Shively | 188—79.5 |

DUANE A. REGER, *Primary Examiner.*